(12) United States Patent
Makita et al.

(10) Patent No.: US 6,328,377 B1
(45) Date of Patent: Dec. 11, 2001

(54) INTERMEDIATE JOINT OF SIDE MEMBER FOR AUTOMOTIVE VEHICLE

(75) Inventors: Masashi Makita; Manabu Sato, both of Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/642,005

(22) Filed: Aug. 21, 2000

(30) Foreign Application Priority Data

Sep. 8, 1999 (JP) .................................................. 11-254865

(51) Int. Cl.[7] ...................................................... B60J 7/00
(52) U.S. Cl. ............................ 296/205; 296/29; 296/194; 296/203.02
(58) Field of Search ............................... 296/29, 30, 194, 296/195, 203.02, 203.04, 205; 280/785

(56) References Cited

U.S. PATENT DOCUMENTS

| 3,633,934 | * | 1/1972 | Wilfert ................................. 280/106 |
| 4,355,844 | * | 10/1982 | Fantini Muzzarelli ............... 296/205 |
| 5,346,276 | * | 9/1994 | Enning et al. ...................... 296/203.02 |
| 5,393,095 | * | 2/1995 | Kreis et al. ........................... 280/785 |
| 5,397,115 | * | 3/1995 | Vlahovic ................................. 296/29 |
| 5,868,457 | * | 2/1999 | Kitagawa ........................ 296/203.02 |
| 5,913,565 | * | 6/1999 | Watanabe ........................ 296/203.02 |
| 6,010,155 | * | 1/2000 | Rinehart ................................. 296/29 |
| 6,068,330 | * | 5/2000 | Kasuga et al. ........................ 296/205 |
| 6,099,071 | * | 8/2000 | Kasuga et al. ........................ 296/205 |
| 6,193,274 | * | 2/2001 | Brown et al. ......................... 296/194 |

FOREIGN PATENT DOCUMENTS

004139329 * 6/1992 (DE) .
10-287269 10/1998 (JP) .

* cited by examiner

Primary Examiner—Joseph D. Pape
Assistant Examiner—Kiran B. Patel
(74) Attorney, Agent, or Firm—McDermott, Will & Emery

(57) ABSTRACT

An intermediate joint is provided which joints two cylindrical members to form a side member used in a vehicle body. The intermediate joint includes a front and a rear connecting portion and an intermediate coupling portion coupling the front and rear connecting portions. The intermediate coupling portion is so formed physically as to have a degree of rigidity greater than those of the front and rear connecting portions. This improves the strength or rigidity of the intermediate joint without increasing the overall weight of the side member.

25 Claims, 18 Drawing Sheets

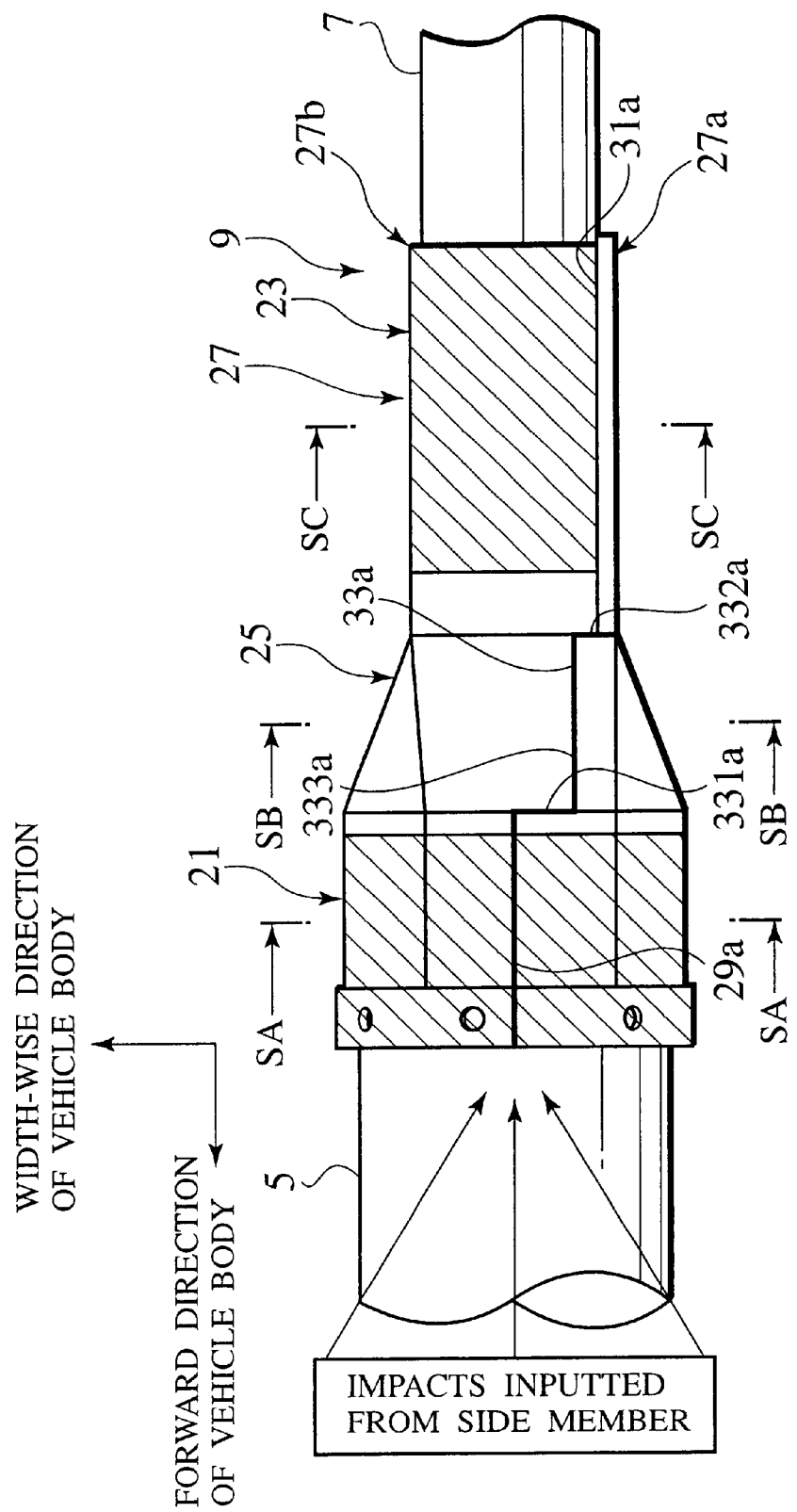

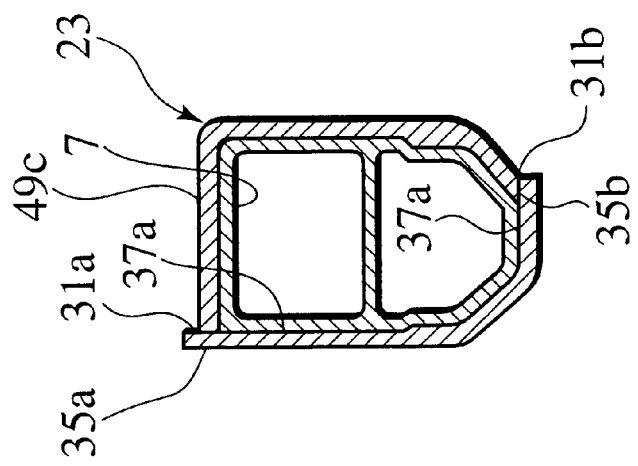
FIG. 6C (SC)
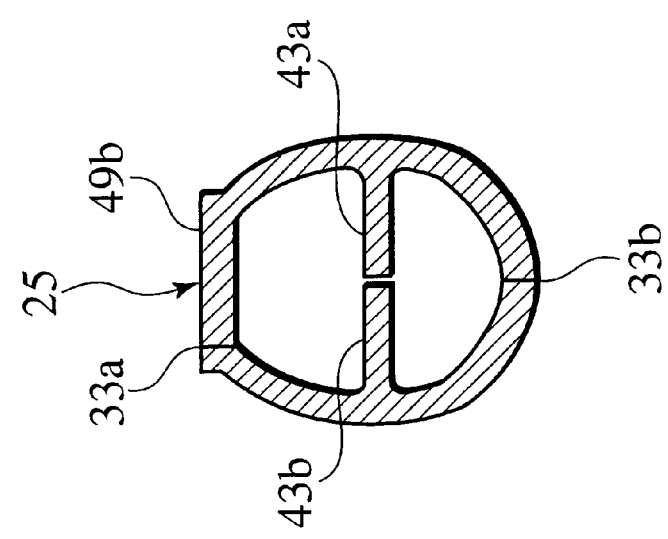
FIG. 6B (SB)
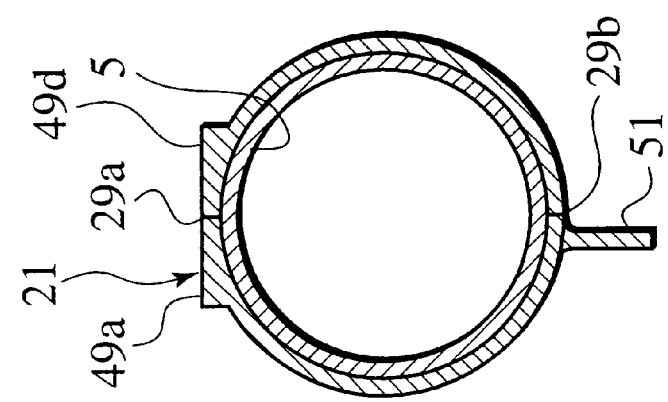
FIG. 6A (SA)

INTERMEDIATE JOINT OF SIDE MEMBER FOR AUTOMOTIVE VEHICLE

BACKGROUND OF THE INVENTION

1. Field of the Invention

The present invention relates generally to an improved structure for an intermediate joint which joins a front and a rear portion of a side member used in a vehicle body.

2. Description of the Related Art

Japanese Patent Application Laid-open No. 10-287269 teaches joining a front and a rear member to form a front side member for use in automotive vehicles. The front member is made of an extruded thin plate, while the rear member is made of an extruded thick plate. A strut housing reinforcement and a suspension bracket are so attached to the front side member as to cover a connection of the front and rear members in order to increase the strength of the connection. This structure serves to distribute various impacts acting on the front side member over parts joining a strut housing, etc. to support the front side member securely. Further, when the automotive vehicle is involved in a front-end collision, the front member made of the extruded thin plate is subjected to plastic deformation to absorb physical energy oriented in a direction of axial compression completely.

The above structure of the front side member, however, has a drawback in that it is difficult to standardize the structure for common use in different types of automotive vehicles because the body size, body structure, and type of suspension are different between the vehicles.

Increasing the degree of reinforcement of the suspension bracket to a desired level against a vertical bending moment exerted on the suspension bracket from the front side member requires increasing the overall thickness of the suspension bracket, which, however, results in a great increase in weight of the structure.

SUMMARY OF THE INVENTION

It is an object of the present invention to provide an intermediate joint for a side member which may be used in different types of automotive vehicles and which has the strength or rigidity improved without increasing the overall weight of the side member.

According to one aspect of the invention, there is provided an intermediate joint of an automotive side member including a front and a rear member which comprises: a front connecting portion receiving therein a portion of the front member of the side member to establish connection with the front member, the front member being made of a cylindrical member having an uniform cross section; a rear connecting portion receiving therein a portion of the rear member of the side member to establish connection with the rear member, the rear member being made of a cylindrical member having an uniform cross section; and an intermediate coupling portion made of a cylindrical member, joining the front and rear connecting portions together. The intermediate coupling portion is so formed physically as to have a degree of rigidity greater than those of the front and rear connecting portions.

BRIEF DESCRIPTION OF THE DRAWINGS

FIG. 5 is a plane view which shows an intermediate joint connecting a front and rear member of a side member together;

FIG. 6A is a sectional view taken along the line SA in FIG. 5;

FIG. 6B is a sectional view taken along the line SB in FIG. 5;

FIG. 6C is a sectional view taken along the line SC in FIG. 5;

DESCRIPTION OF THE PREFERRED EMBODIMENTS

Figure 1:
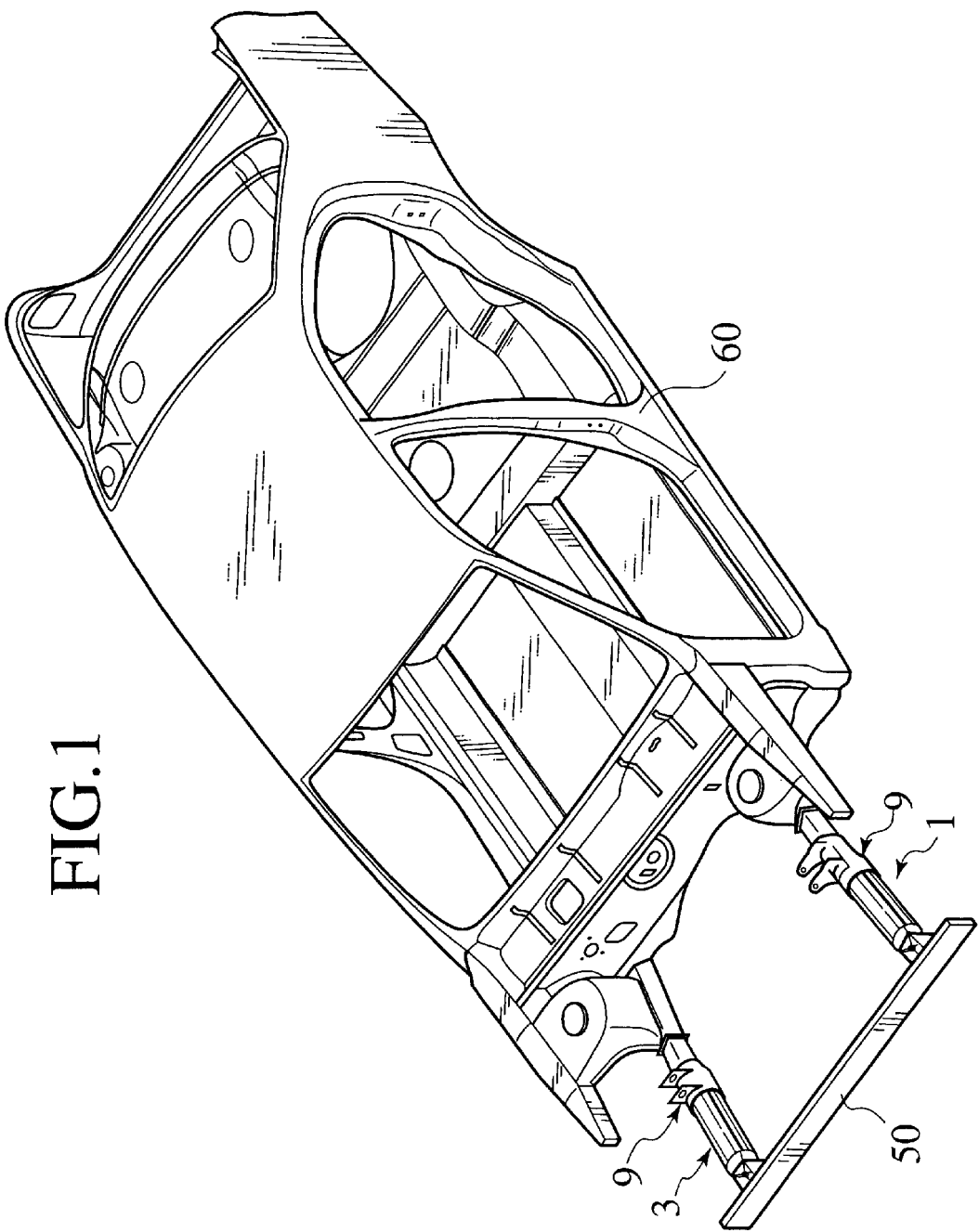
FIG. 1 is a perspective view which shows a vehicle body provided with side members joined using intermediate joints according to the first embodiment of the invention.

Referring now to the drawings, wherein like numbers refer to like parts in several views, particularly to FIGS. 1 to 6, there is shown left and right front side members 1 and 3 of an automotive vehicle according to the first embodiment of the invention.

The front side members 1 and 3, as clearly shown in FIG. 1, extend longitudinally of a vehicle body 60 and connect at front ends thereof with each other through a front cross member 50.

Figure 2:
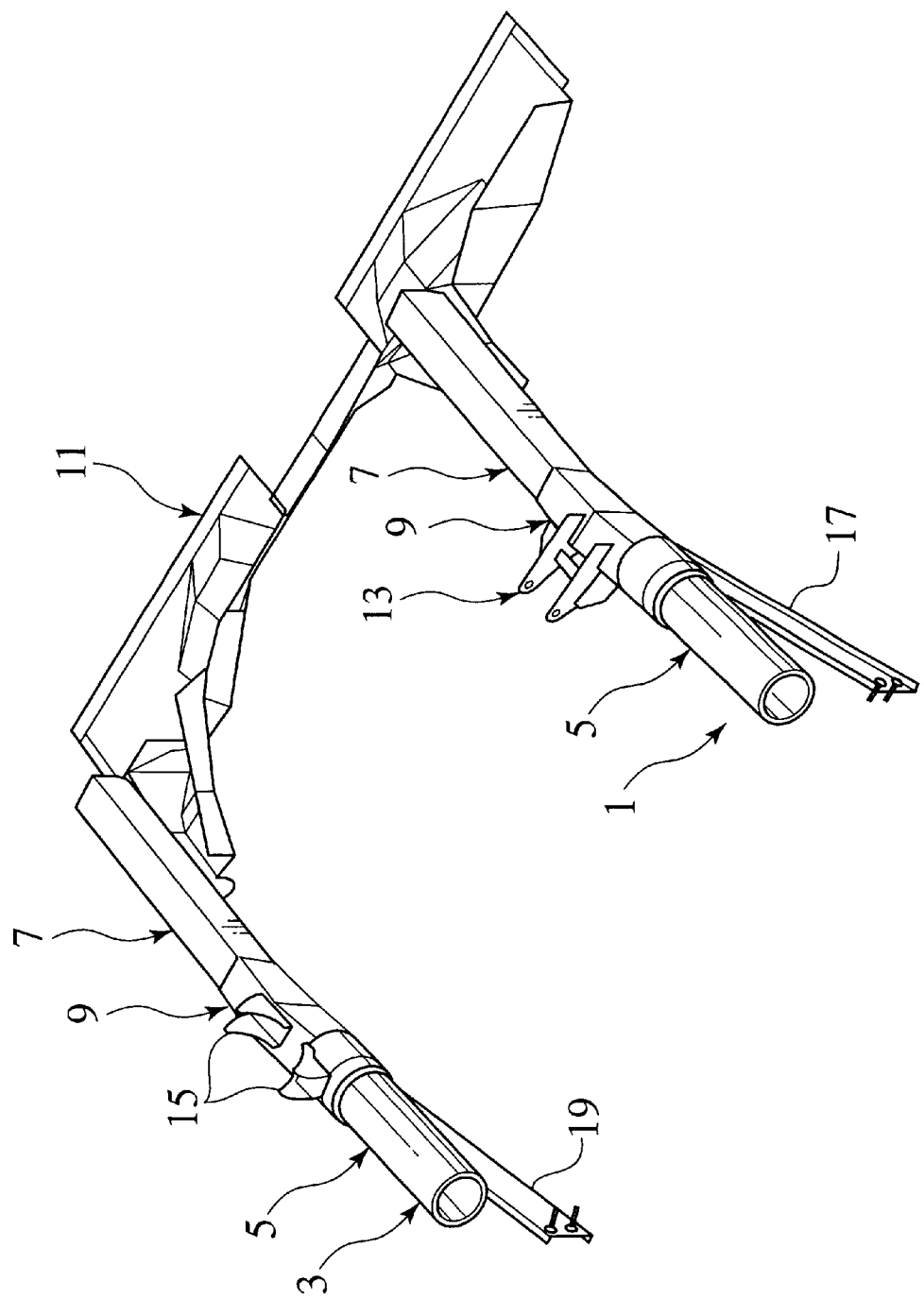
FIG. 2 is a perspective view which shows side members connected using intermediate joints according to the first embodiment of the invention.
Figure 3:
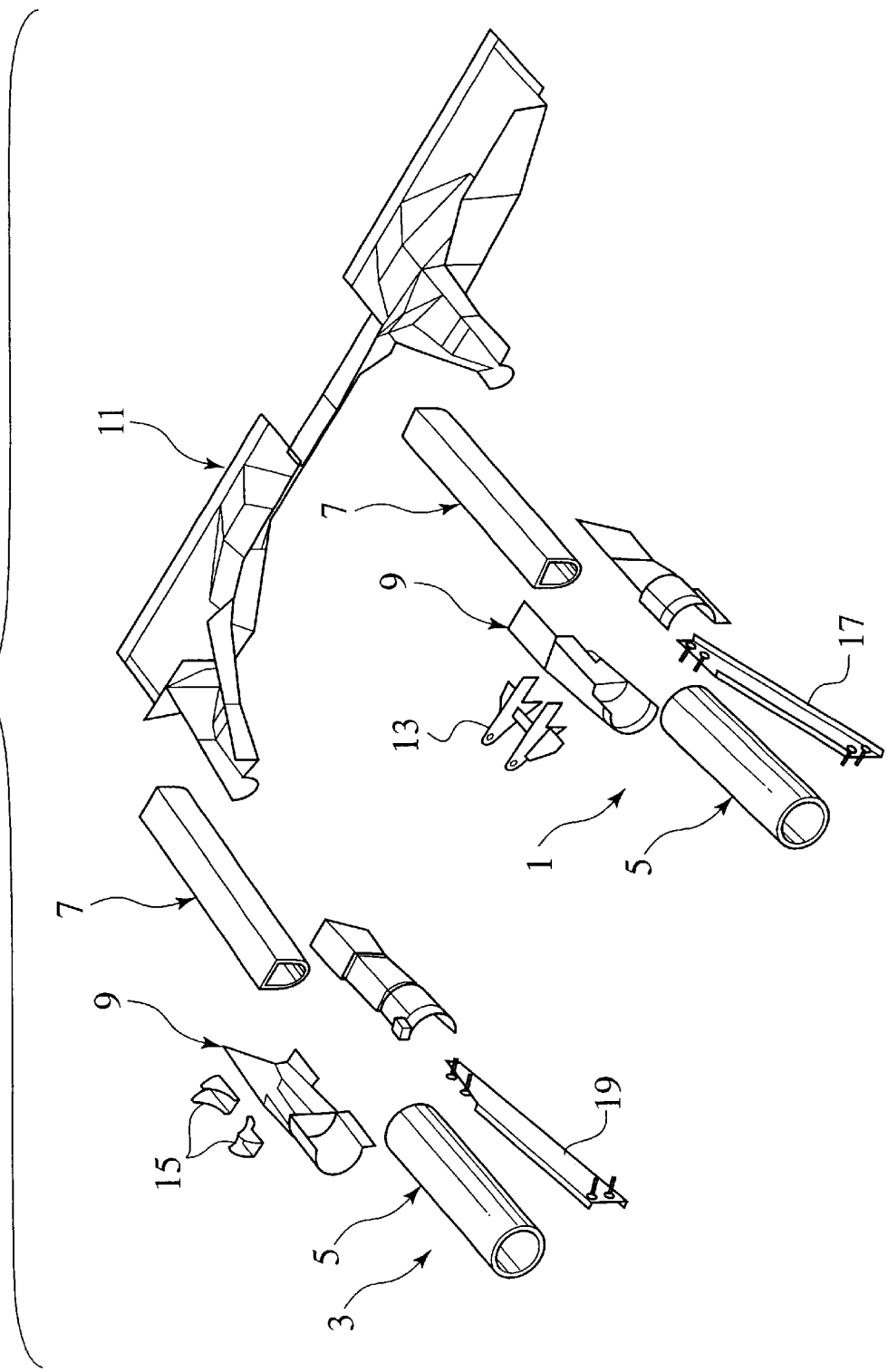
FIG. 3 is an exploded perspective view of FIG. 2.

Each of the front side members 1 and 3, as clearly shown in FIGS. 2 and 3, includes a front member 5 and a rear member 7 which are connected through an intermediate joint 9. The front side members 1 and 3 are connected at rear ends thereof to a vehicle body through a side member reinforcement 11. Engine mount brackets 13 and 15 are welded to the intermediate joints 9 of the front side members 1 and 3, respectively. Left and right tie-down reinforcements 17 and 19 are attached at ends thereof to the intermediate joints 9, respectively.

The front members 5 are each formed by an extruded thin-walled plate of a light metal such as aluminum or magnesium alloy and is of cylindrical shape having a constant thickness, for example, a circular shape. The rear members 7 form rear portions of the front side members 1 and 3 and are each made of a cylindrical member having a constant thickness which is, for example, of irregular hexagonal shape in cross section. The front member 5 and the rear members 7 are inserted at ends thereof into the intermediate joints 9. The right and left intermediate joints 9 are symmetrical in geometry, and only the left intermediate join 9 will be described below with reference to FIGS. 3 to 5 for the brevity of disclosure.

The intermediate joint 9 is cast in a light metal such as aluminum or magnesium alloy and formed by a cylindrical member 27 The cylindrical member 27 consists of a front connecting portion 21, a rear connecting portion 23, and an intermediate coupling portion 25. The front connecting portion 21 holds therein an end portion of the front member 5 firmly. Similarly, the rear connecting portion 23 holds therein an end portion of the rear member 7 firmly. The front and rear members 5 and 7 are not inserted into the intermediate coupling portion 25. The thickness of the cylindrical member 27 is not constant in the lengthwise direction and increases in the order of the front connecting portion 21, the rear connecting portion 23, and the intermediate coupling portion 25. Specifically, the thickness of the intermediate coupling portion 25 is the greatest of the three. The thickness of the rear connecting portion 23 is greater than that of the front connecting portion 21. The modulus of section of the cylindrical member 27, thus, becomes greater in the order of the front connecting portion 21, the rear connecting portion 23, and the intermediate coupling portion 25.

The cylindrical member 27 has ends welded along at least one pair of front split lines 29a and 29b in the front connecting portion 21 and at least one pair of rear split lines 31a and 31b in the rear connecting portion 23. The front and rear split lines 29a, 29b, 31a, and 31b extend in a lengthwise direction of the cylindrical member 27 or longitudinally of the vehicle body. The cylindrical member 27 also has ends welded along at least one pair of intermediate split lines 33a and 33b in the intermediate coupling portion 25. Specifically, the cylindrical member 27 is made up of two assembly members 27a and 27b, as will be described below in detail, welded end to end along the split lines 29a, 29b, 31a, 31b, 33a, and 33b.

The assembly members 27a and 27b are welded along the split lines 29a, 29b, 31a, 31b, 33a, and 33b. The attachment of the assembly members 27a and 27b may alternatively be accomplished by retaining the front member 5 and the rear member 7 in the front connecting portion 21 and the rear connecting portion 23, respectively, and bolting the assembly members 27a and 27b together.

The front split lines 29a and 29b are offset from the rear split lines 31a and 31b in a width-wise direction of the vehicle body. If one of the front and rear connecting portions 21 and 23 is circular in cross section, the front split lines 29a and 29b or the rear split lines 31a and 31b of the one are defined at the center in the width-wise direction of the vehicle body. If one of the front and rear connecting portions 21 and 23 is polygonal in cross section, the front slit lines 29a and 29b or the rear split lines 31a and 31b of the one are defined along contact areas between edges of one of the assembly members 27a and 27b and a wall of the other.

In this embodiment, the front connecting portion 21 is circular in cross section. The front split lines 29a and 29b are, thus, so defined as to extend intermediate between the right and left sides of the front connecting portion 21. The rear connecting portion 23 is polygonal in cross section. The assembly member 27b is connected at ends 35a and 35b thereof to the wall surface 37a of the assembly member 27a.

Figure 4:
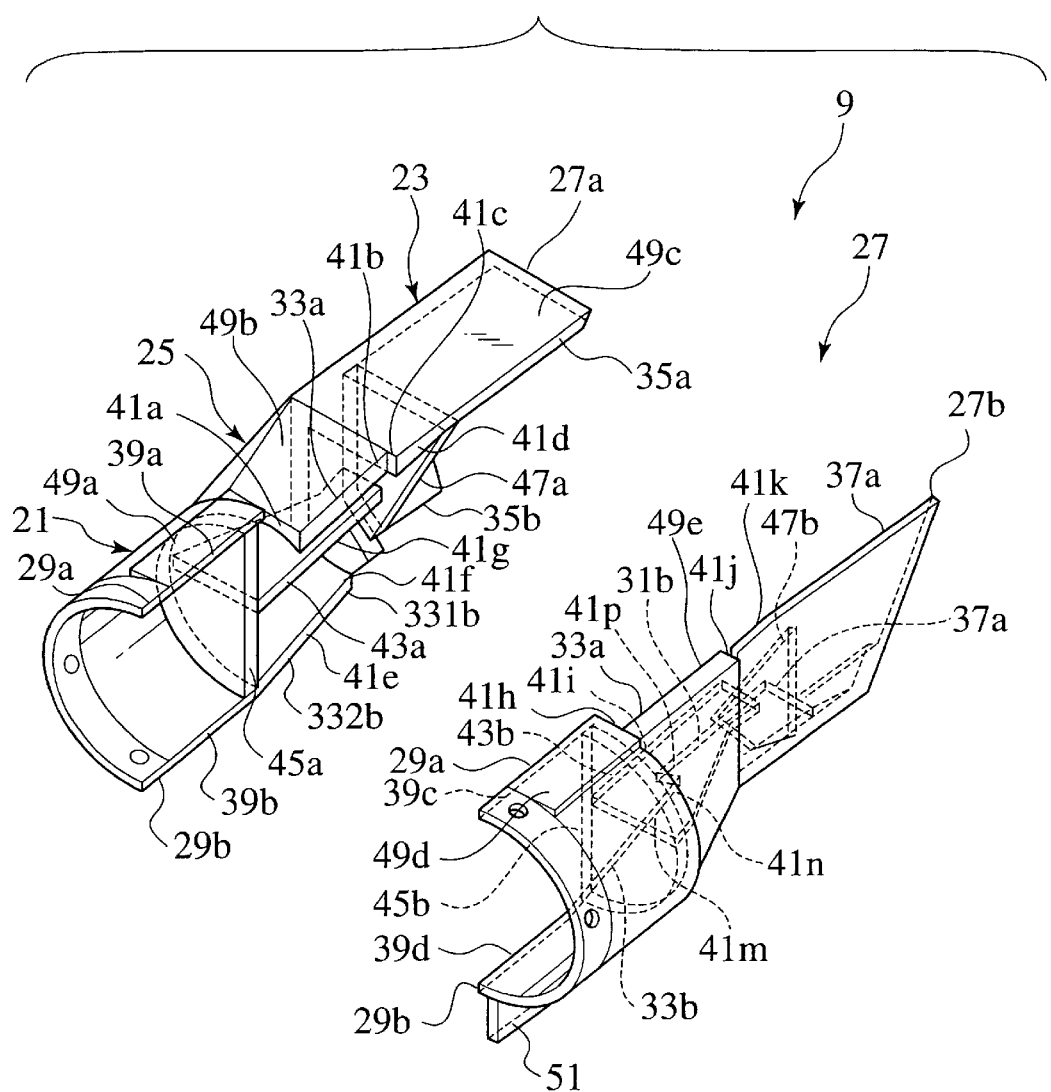
FIG. 4 is an exploded perspective view which shows an intermediate joint.

The intermediate split lines 33a and 33b are at least partially oriented in the width-wise direction of the vehicle body. Specifically, the intermediate split line 33a is, as clearly shown in FIG. 5, defined by three segments: a front segment 331a, a rear segment 332a, and an intermediate segment 333a. The front segment 331a and the rear segment 332a extend laterally of the vehicle body. The intermediate segment 333a extends longitudinally of the vehicle body. The intermediate split line 33b is, as can be seen in FIG. 4, defined by a laterally extending front segment 331b and a diagonal rear segment 332b. The laterally extending front segment 331b extends in the width-wise direction of the vehicle body. The diagonal segment 332b extends longitudinally of the intermediate coupling portion 25 and is inclined at a given angle to the width-wise direction.

The assembly members 27a and 27b have butt surfaces 39a, 39b, 39c, 39d, 41a, 41b, 41c, 41d, 41e, 41f, 41g, 41h, 41i, 41j, 41k, 41m, and 41n formed in the front connecting portion 21, the intermediate coupling portion 25, and the rear connecting portion 23 which define the front split lines 29a and 29b and the intermediate split lines 33a and 33b. The butt surfaces 39a, 39b, 41a, 41b, 41c, 41d, 41e, 41f, and 41g are joined to the butt surface 39c, 39d, 41h, 41i, 41j, 41k, 41m, 41n, and 41p, respectively. The butt surfaces 41g and 41p are jointed to each other in the same form as that of the joint of the end surface 35b of the rear connecting portion 23 and the wall surface 37a.

The ends 35a and 35b of the rear connecting portion 23, as described above, butt against the wall surface 37a.

The assembly of the intermediate joint 9 is achieved by the so-called butt joint, that is, placing each of the above described butt surfaces in engagement with a corresponding one of them and welding the assembly members 27a and 27b along the split lines 29a, 29b, 31a, 31b, 33a, and 33b to form the cylindrical member 27.

The assembly members 27a and 27b have formed on an inner wall of the intermediate coupling portion 25 pairs of ribs 43a and 43b, 45a and 45b, and 47a and 47b. The ribs 45a and 45b are made of semi-circular plates which form a circular partition at the front end of the intermediate coupling portion 25 when the assembly members 27a and 27b are joined. The ribs 47a and 47b are made of rectangular plates which form an irregular polygonal partition at the rear end of the intermediate coupling portion 25. The ribs 43a and 43b extend horizontally along the longitudinal center line of the intermediate coupling portion 25 between the ribs 45a and 45b and the ribs 47a and 47b. The ribs 45a and 45b also work as a stopper upon insertion of the front member 3 into the front connecting portion 21. Similarly, the ribs 47a and 47b also work as a stopper upon insertion of the rear member 7 into the rear connecting portion 23.

The assembly members 27a and 27b also have formed on upper walls thereof flat portions 49a, 49b, 49c, 49d, and 49e which define upper flat surfaces of the intermediate joint 9 after the assembly members 27a and 27b are joined. On the upper flat surfaces, the engine mount brackets 13 and 15, as shown in FIG. 2, are installed. On a lower surface of the front connecting portion 21 of the assembly member 27b, the tie-down reinforcement 51 extends vertically.

The front and rear members 5 and 7 are, as described above, made of the extruded light metal plates, thereby facilitating ease of shaping of the front side members 1 and 3 and providing a light weight structure. Similarly, the intermediate joints 9 are made of light metal castings, thereby facilitating ease of shaping thereof and providing a light weight structure. Further, the use of the intermediate joints 9 allows the front side members 1 and 3 to be employed in all vehicles regardless of types thereof.

Each of the front side members 1 and 3 is, as described above, made up of the thin-walled front member 5, the thick-walled rear member 7, and the intermediate joint 9. The front and rear members 5 and 7 are fitted at their ends in the intermediate joint 9. Specifically, the end portions of the front and rear members 5 and 7 are fitted in the front connecting portions 21 defined by the ribs 45a and 45b and the rear connecting portion 23 defined by the ribs 47a and 47b which are illustrated by hatched lines in FIG. 4. This increases the distribution of moduli of section of a portion of the intermediate coupling portion 25 following the front end portion thereof.

Figure 7:
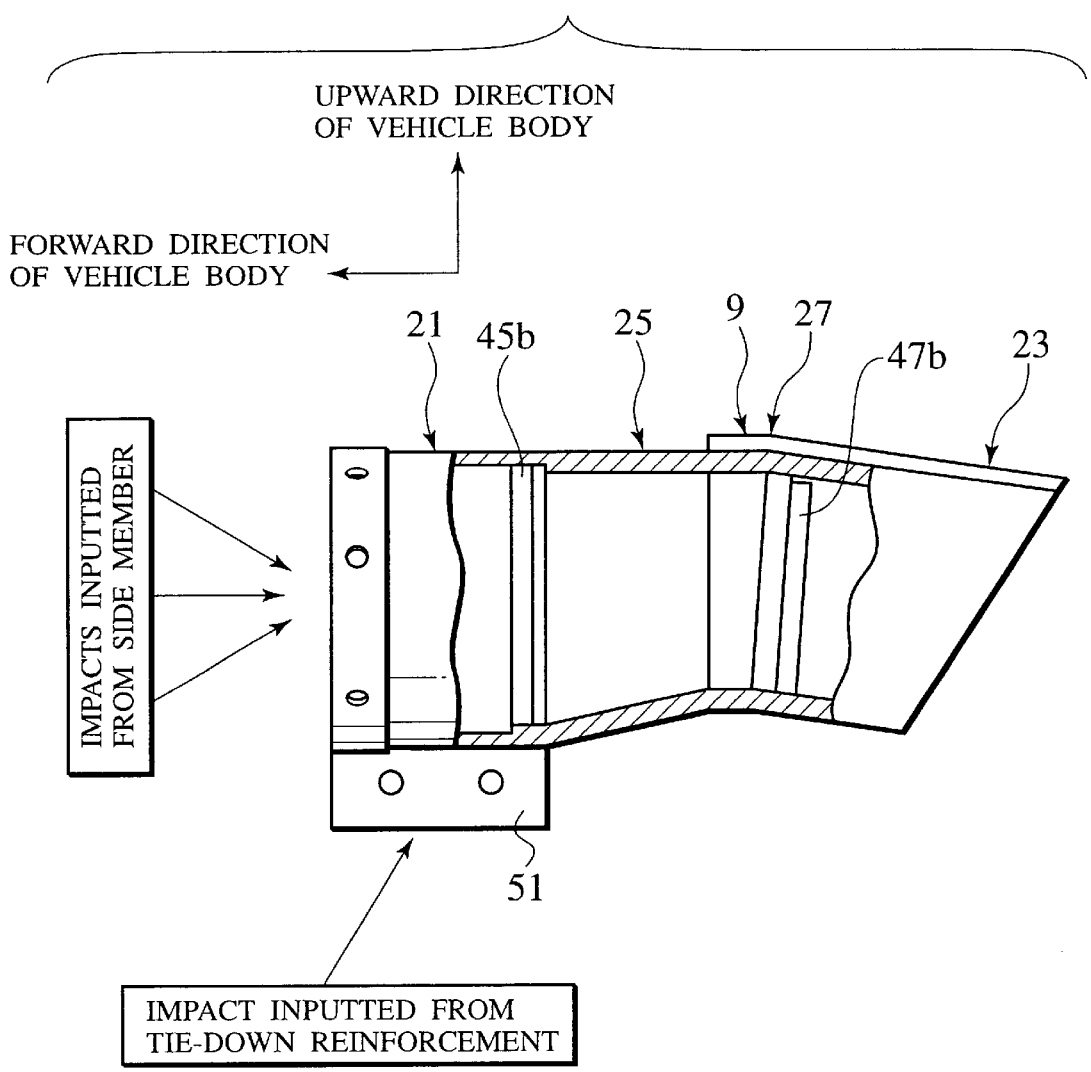
FIG. 7 is a vertical sectional view which shows an intermediate joint.

Particularly, the intermediate coupling portion 25, as shown in FIGS. 6A to 6C, has the thickness greater than those of the front and rear connecting portions 21 and 23. The front connecting portion 21 is the smallest in thickness of the three. This causes the distribution of moduli of section of a portion of the intermediate joint 9 following the front connecting portion 21 to increase, thereby decreasing or absorbing the stress arising from various impact inputted from the side members 1 and 3, as shown in FIGS. 6 and 7, such as compression and bending pressures, resulting in an increased strength of the intermediate joint 9. The partial increase in thickness of the intermediate joint 9 avoids an excessive increase in overall weight thereof.

Figure 8A:
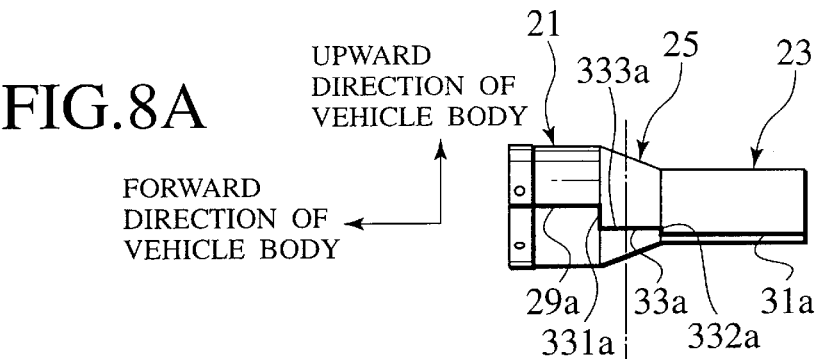
FIGS. 8A, 8B and 8C are a top view, a side view, and a bottom view, respectively, for explaining the operation of an intermediate joint when undergoing bending moment.
Figure 8B:
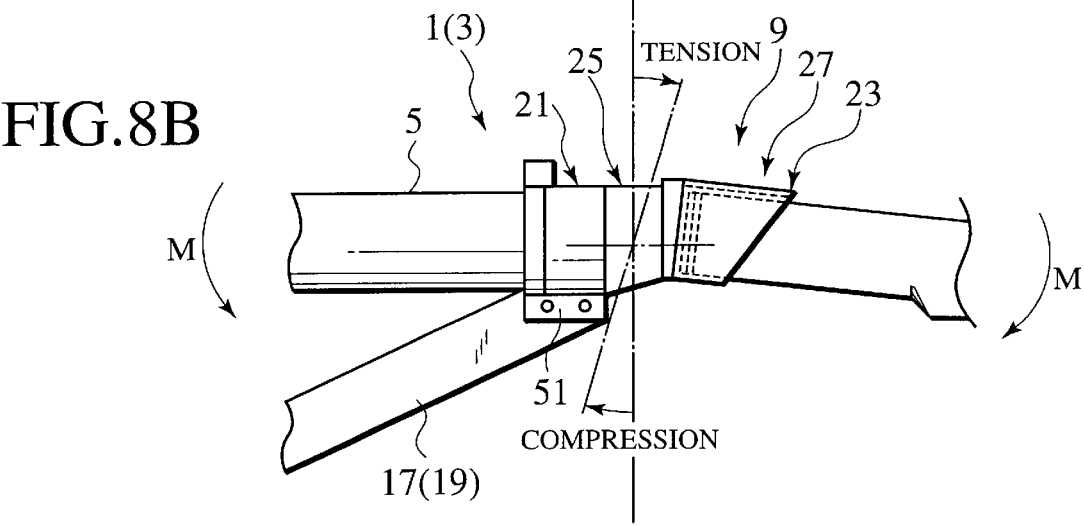

If the bending moment M, as shown in FIG. 8B, acts on the whole of the front side member 1 or 3 to produce tensile force and compressive force acting on the upper wall and the lower wall of the intermediate joint 9, respectively, it will cause the tensile force and the compressive force to be absorbed effectively by the shearing of the welded surfaces along the intermediate segment 333a extending longitudinally of the vehicle body, the diagonal rear segment 332b, the front segment 331a extending laterally of the vehicle body, and the rear and front segments 332a and 331b extending laterally of the vehicle body and the compression and tension of the segments 331a, 332a, and 331b.

If a towing force is inputted from the tie-down reinforcements 17 and 19, it will cause the bending moment to act on the intermediate joint 9 upward to produce tensile and compressive forces in directions opposite the ones as described above in FIG. 8B, but these forces are absorbed greatly by the same activities of the intermediate joint 9.

Figure 9:
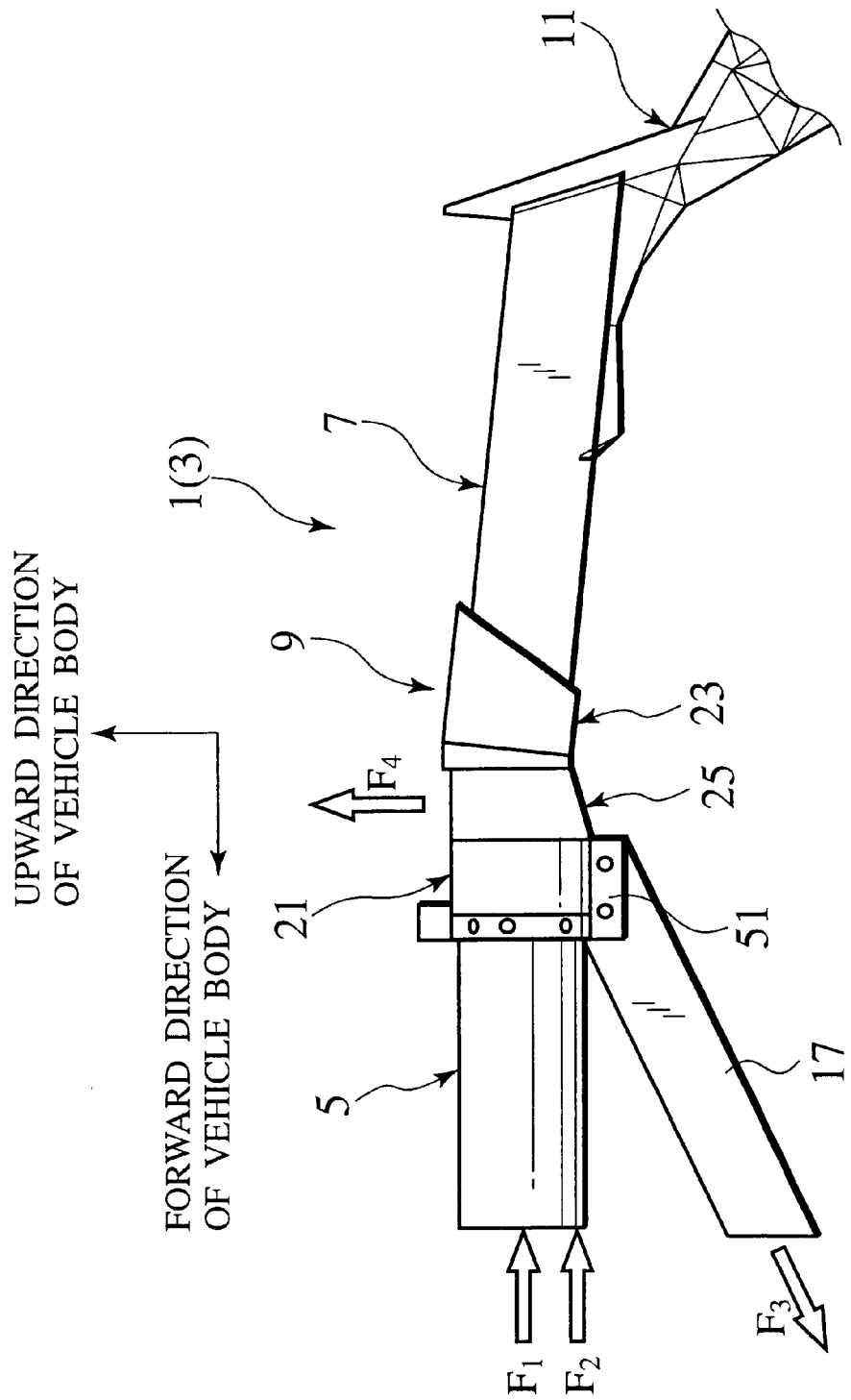
FIG. 9 shows possible impacts acting on a side member.
Figure 10:
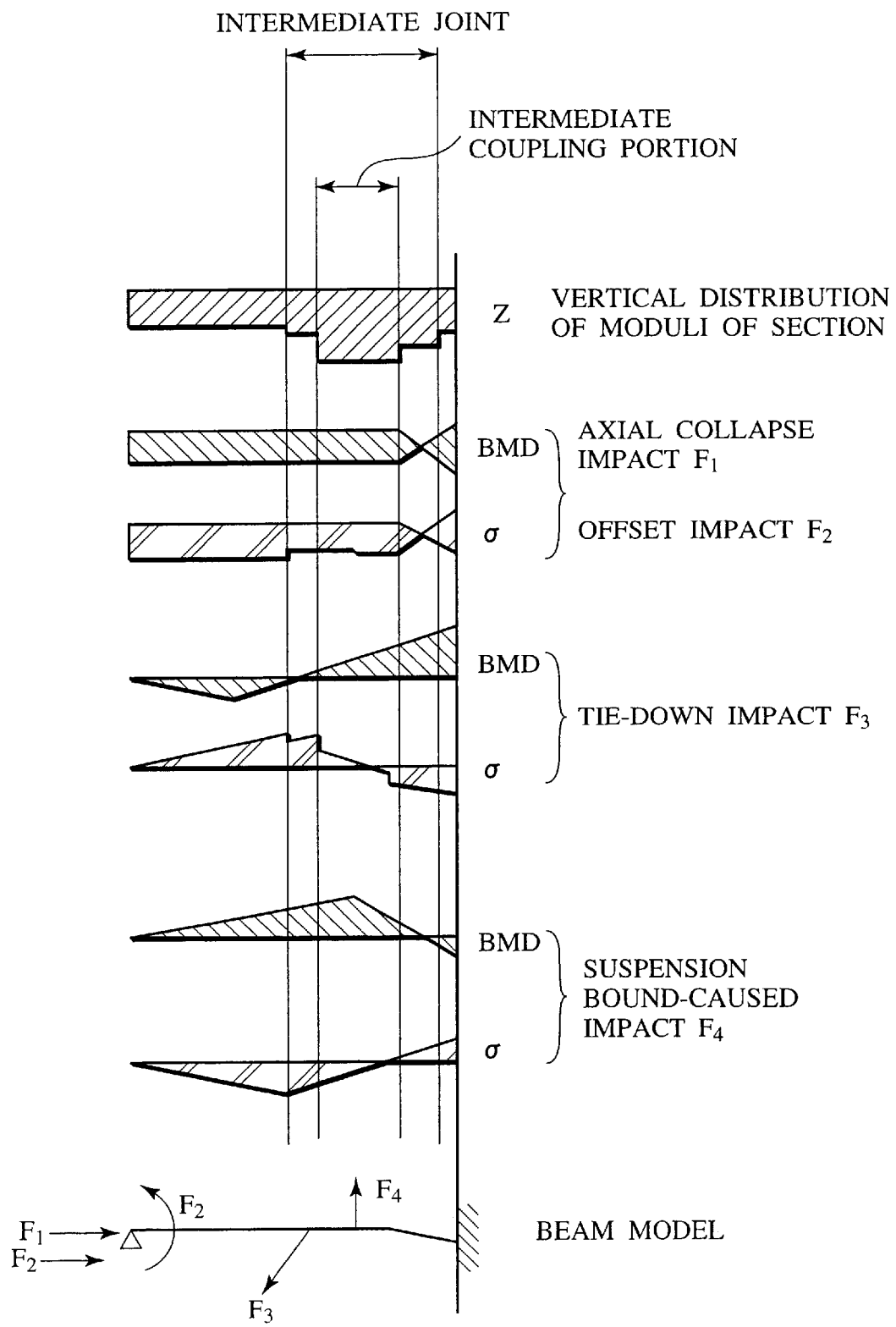
FIG. 10 shows distributions of moduli of section, distributions of bending moments, distributions of stresses, and a beam model of a portion of a side member around an intermediate joint.

The above operations will be described below in detail with reference to FIGS. 9 and 10. FIG. 9 illustrates possible loads or impacts acting on each of the front side members 1 and 3. FIG. 10 illustrates the distribution Z of moduli of vertical section of a length of each of the front side members 1 and 3, the bending moments BMD, the distribution σ of stresses produced by the bending moments, and a beam model.

Each of the front side members 1 and 3 is, as already described, made by connecting the thin-walled front member 5 and the thick-walled rear member 7 using the intermediate joint 9. The intermediate joint 9 increases in thickness in the order of the front connecting portion 21, the rear connecting portion 23, and the intermediate coupling portion 25. The distribution of moduli of section of the intermediate joint 9 undergoing the bending moment acting on each of the front side member 1 and 3, thus, increases from the front end of the intermediate joint 9.

Figure 8C:
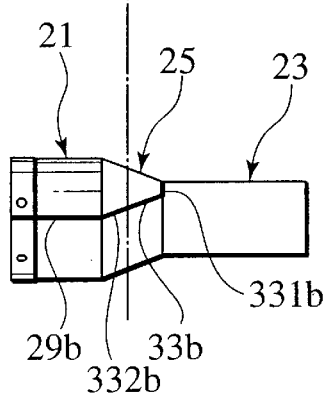

The bending moments BMD and the distribution σ of stresses produced by the bending moments BMD when impacts F1, F2, and F3, as shown in FIG. 9, are inputted to the front side members 1 and 3 to produce, as shown in FIG. 8, the bending moment M acting on the whole of the front side members 1 and 3 will be described below.

<Input of Axial Collapse Impact F1 Arising From a Front End Collision of the Vehicle>

When the axial collapse impact F1 is input to the front side members 1 and 3, it is distributed through the rear member 7 and the side member reinforcement 11 of each of the front side members 1 and 3 over a dash lower panel. The front side members 5 are plastically deformed, thereby absorbing the axial collapse impact F1 effectively.

<Input of Offset Impact F2 Arising From a Front End Collision of the Vehicle>

When the offset impact F2 is inputted to the front side members 1 and 3, substantially the same bending moments are produced from the front side members 1 and 3 to the dash panel. The stress produced at each of the intermediate joints 9 having a greater modulus of section is, thus, small. The plastic deformation of the front members 5 in the axial direction (i.e., lengthwise direction) thereof absorb the offset impact F2 effectively.

<Input of Tie-down Impact F3>

The tie-down impact F3 is an input oriented downward. Each of the front side members 1 and 3 may, thus, be considered as a cantilever securely fixed at one end to the dash panel. The bending moment acting on a portion of each of the front side members 1 and 3 increases as the portion approaches the dash panel. The intermediate joint 9 has, as described above, a modulus of section which is great enough to establish complete transmission of force between the front member 5 and the rear member 7 through the intermediate joint 9. The absolute value of stress occurring at the front member 5 is low, thereby minimizing the degree of plastic deformation thereof.

<Input of Suspension Bound-Caused Impact F4>

When the suspension bound-caused impact F4 is inputted to bend the whole of the front side members 1 and 3, it is absorbed effectively by the tension of a thick-walled sectional area of the intermediate joint 9 along the intermediate split line 33a.

The ribs 43a, 43b, 45a, 45b, 47a, and 47b are, as described above, disposed in the intermediate coupling portion 25 of the intermediate joint 9 to reinforce the intermediate coupling portion 25, thereby distributing input loads. The front member 5 of each of the front side members 1 and 3 is made of a thin-walled extruded plate and supported within the thick-walled intermediate coupling portion 25 in engagement with the ribs 45a and 45b serving as a stopper, thereby facilitating the plastic deformation of the front member 5 to absorb physical energy produced in the axial collapse direction (i.e., the longitudinal direction of the front side members 1 and 3) by a front end collision of the vehicle.

The upper and lower intermediate split lines 33a and 33b of the intermediate coupling portion 25 are asymmetrical with respect to the longitudinal center line of the intermediate joint 9, thereby allowing various pressures or impacts inputted from the front side members 1 and 3 to be received by welded surfaces of the assembly members 27a and 27b and the thick-walled sectional area of the intermediate coupling portion 25 as shearing compressive pressures that are uniform in the lateral direction, which reduces a local stress occurring at the intermediate joint 9.

Some of the segments of the split lines 29a, 29b, 31a, 31b, 33a, and 33b extending laterally (i.e., in the width-wise direction of the vehicle) may be determined in length based on the degree of bending moment inputted to the front side members 1 and 3, thereby facilitating absorption of input impacts. For instance, an increase in resistance to the compressive impact arising from the bending moment may be achieved by prolonging the laterally extending segments in light of mechanical properties that a casing usually has a great resistance to the compressive impact. An increase in resistance to tensile impact may be achieved by determining the shape of the split lines so as to increase the length of the welded areas. Each of the front split lines 29a and 29b of the front connecting portion 21 extends along the center line intermediate in the width-wise direction of the vehicle body. When the impact is inputted in a direction perpendicular to the front split lines 29a and 29b, it is distributed uniformly onto the assembly members 27a and 27b of the intermediate joint 9, thus reducing the possibility of cracks in the welded areas of the intermediate joint 9.

The rear connecting portion 23 is of an irregular polygonal shape in cross section and formed using two separate parts: the assembly members 27a and 27b, thereby facilitating ease of formation of surfaces to be welded and establishment of desired internal geometry of the rear connecting portion 23.

Figure 11A:
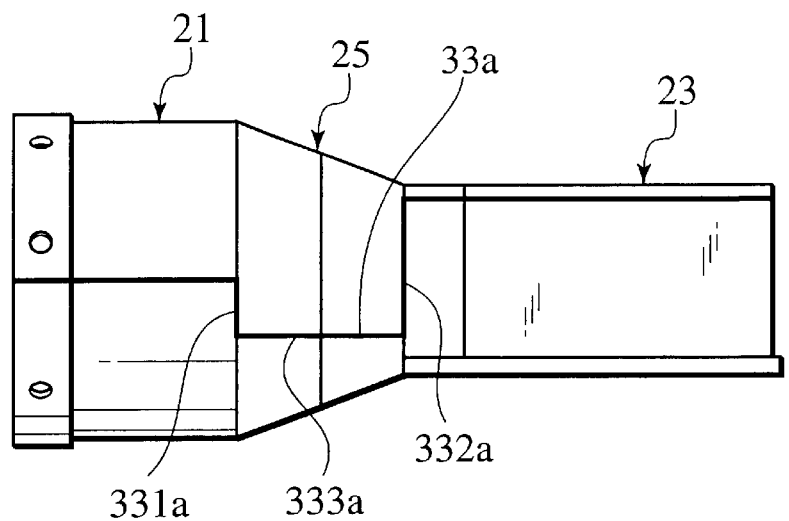
FIG. 11A is a plan view which shows the first modification of the first embodiment.
Figure 11B:
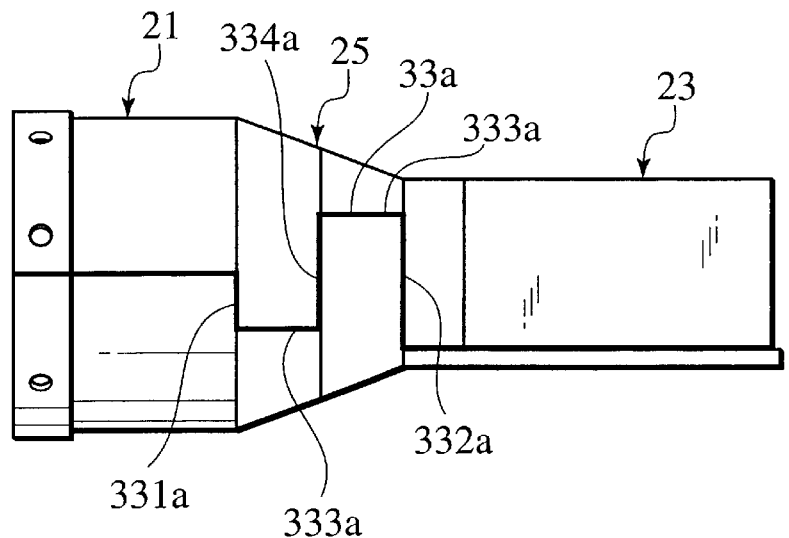
FIG. 11B is a plan view which shows the second modification of the first embodiment.
Figure 11C:
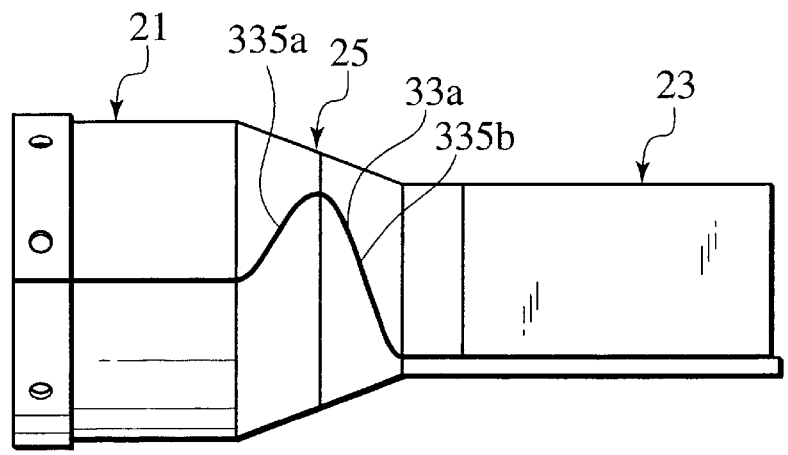
FIG. 11C is a plan view which shows the third modification of the first embodiment.

FIGS. 11A, 11B, and 11C show modifications of the first embodiment.

In the modification of FIG. 11A, the rear segment 332a of the intermediate split line 33a is increased in length as compared with the one in the first embodiment.

In the modification of FIG. 11B, the intermediate split line 33a includes the rear segment 332a which is, like the modification of FIG. 11A, increased in length and further includes a lateral segment 334a which extends centrally of the intermediate coupling portion 25 in the width-wise direction of the vehicle body. This results in an increase in length of a welded area of the thick wall of the intermediate coupling portion 25, which improves the absorption of physical energy of impact acting on the front side members 1 and 3.

In the modification of FIG. 11C, the intermediate split line 33a is defined by curved segments 335a and 335b projecting in the width-wise direction of the vehicle body. This enables the butt surfaces of the thick wall of the intermediate coupling portion 25 to absorb a great deal of physical energy arising from impact inputted to the front side members 1 and 3 from a diagonal direction relative to the longitudinal center line thereof.

Figure 12:
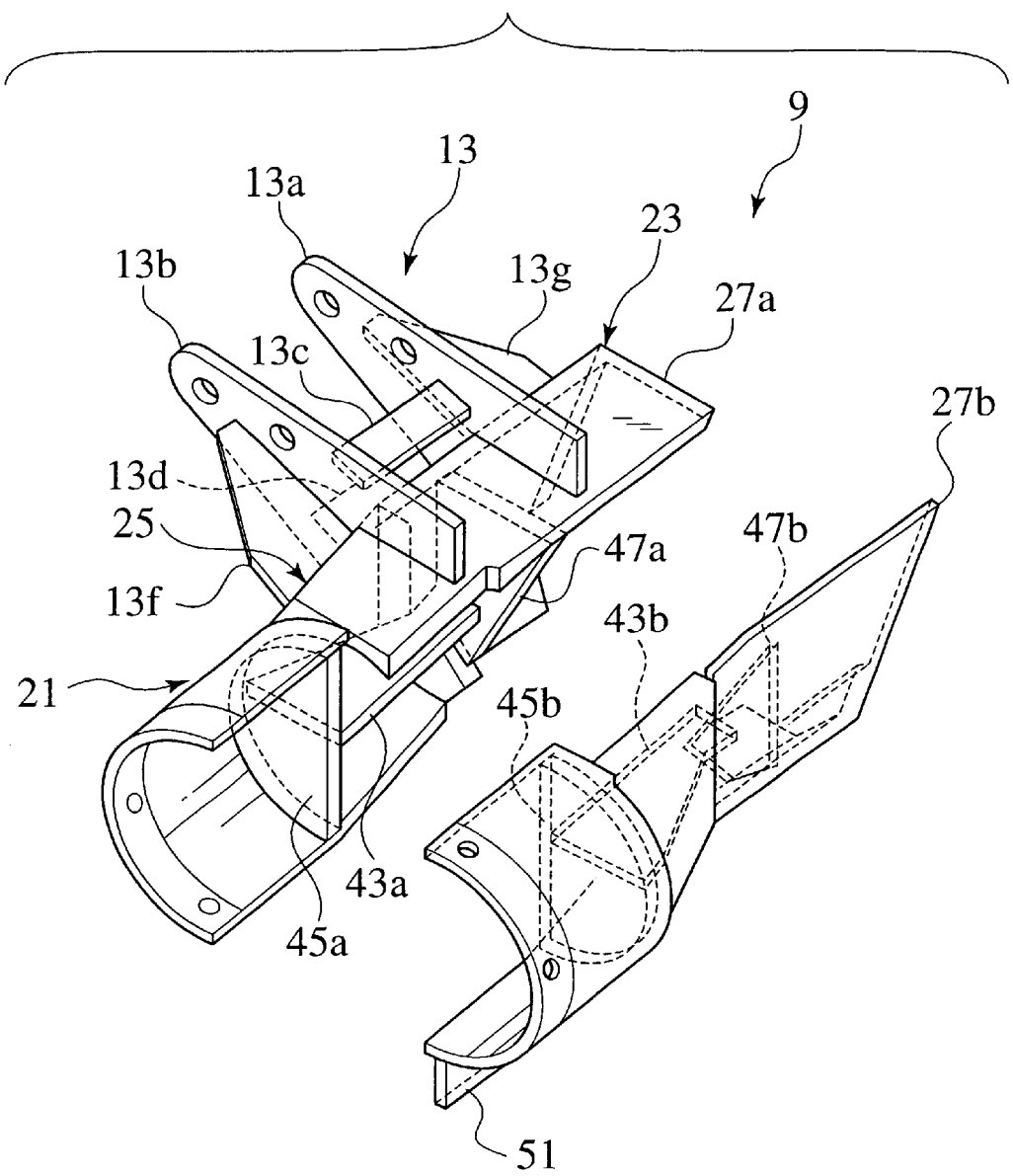
FIG. 12 is an exploded perspective view which shows an intermediate joint according to the second embodiment of the invention.
Figure 13:
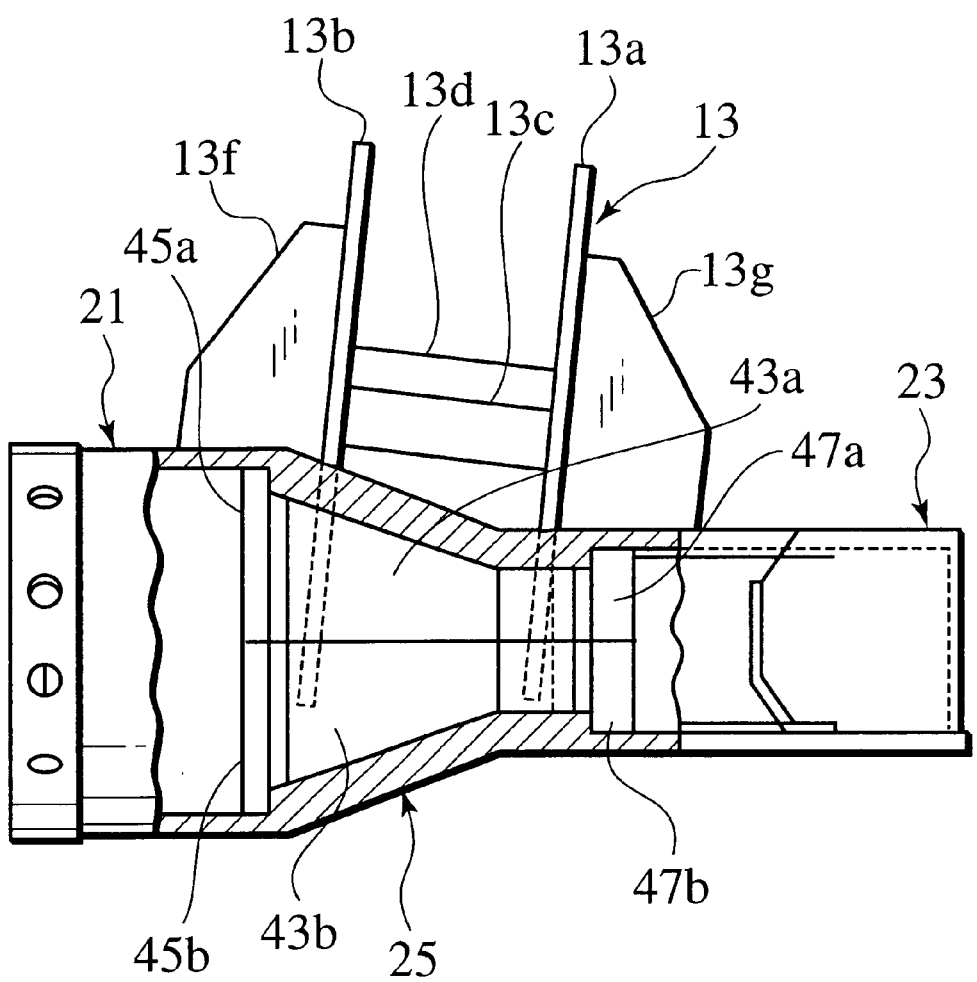
FIG. 13 is a partial cutaway view which shows an intermediate joint of the second embodiment.

FIGS. 12 and 13 show the intermediate joint 9 according to the second embodiment of the invention which is different from the one in the first embodiment in that the engine mount bracket 13 is cast in light metal such as aluminum alloy or magnesium alloy together with the intermediate joint 9. The same reference numbers as employed in the first embodiment refer to the same parts, and explanation thereof in detail will be omitted here.

The intermediate joint 9 is, like the first embodiment, made of a cylindrical member formed by joining the assembly members 27a and 27b together. The engine mount bracket 13 is formed integrally with the assembly member 27a and, as clearly shown in FIG. 13, extends from the intermediate coupling portion 25.

The engine mount bracket 13 consists of a pair of arms 13a and 13b, upper and lower connecting plates 13c and 13d, and blades 13f and 13g. The upper and lower connecting plates 13c and 13d extend horizontally to connect the arms 13a and 13b together. The blades 13f and 13b connect outside walls of the arms 13a and 13b with an outer wall of the assembly member 27a, respectively.

The ribs 43a, 43b, 45a, 45b, 47a, and 47b disposed within the intermediate coupling portion 25 serve to reinforce fixing of the engine mount bracket 13 on the intermediate coupling portion 25 and minimize the stress arising in the intermediate joint 9 from impact inputted from the engine mount bracket 13. The ribs 43a, 43b, 45a, 45b, 47a and 47b also serve to increase the distribution of moduli of section of the intermediate joint 9 undergoing the bending moment, thereby minimizing the stress arising from impact inputted from the front side members 1 and 3.

Specifically, the ribs 45a, 45b, 47a, and 47b extend in the width-wise direction of the vehicle body in parallel to the ends of the front and rear members 5 and 7 within each of the front side members 1 and 3 to form sectional areas of the intermediate joint 9 undergoing vertical and lateral impacts acting on the engine mount bracket 13, thereby increasing the rigidity of the intermediate joint 9. The increase in rigidity also minimizes vibrations transmitted from the engine to the vehicle body.

The ribs 43a and 43b extend horizontally between the ribs 45a and 45b and the ribs 47a and 47b and work to reduce the buckling of walls of the intermediate coupling portion 25 of the intermediate joint 9 caused by input of impacts in the vertical direction of the vehicle body. The ribs 43a and 43b also work to avoid inclination of the ribs 45a, 45b, 47a, and 47b in the longitudinal direction of the vehicle body when longitudinal impacts are inputted thereto. In other words, the ribs 43a and 43b serve as supports for suppressing movement of the ribs 45a, 45b, 47a, and 47b, thus improving the rigidity of the intermediate joint 9 against both the longitudinal and lateral impacts.

Therefore, the arrangements of the ribs 43a, 43b, 45a, 45b, 47a, and 47b, as described above, improve the rigidity of the intermediate coupling portion 35 of the intermediate joint 9, thereby attenuating the vibration transmitted from the engine to the vehicle body greatly.

The ribs 43a, 43b, 45a, 45b, 47a, and 47b also work as stoppers which avoid backward movement of the front side members 1 and 3 when the vehicle is involved in the front-end collision. Specifically, the impact inputted to the front member 5 presses the ribs 45a and 45b backward. The ribs 43a and 43b extending longitudinally of the front side members 1 and 3, however, function to increase the resistance of the ribs 45a, 45b, 47a, and 47b to the impact from the front member 5, thereby avoiding undesired backward movement of the front side members 1 and 3. This allows the front member 5 of each of the front side members 1 and 3 to be collapsed upon occurrence of the front-end collision, thereby absorbing the physical energy arising from the collision greatly.

Figure 14:
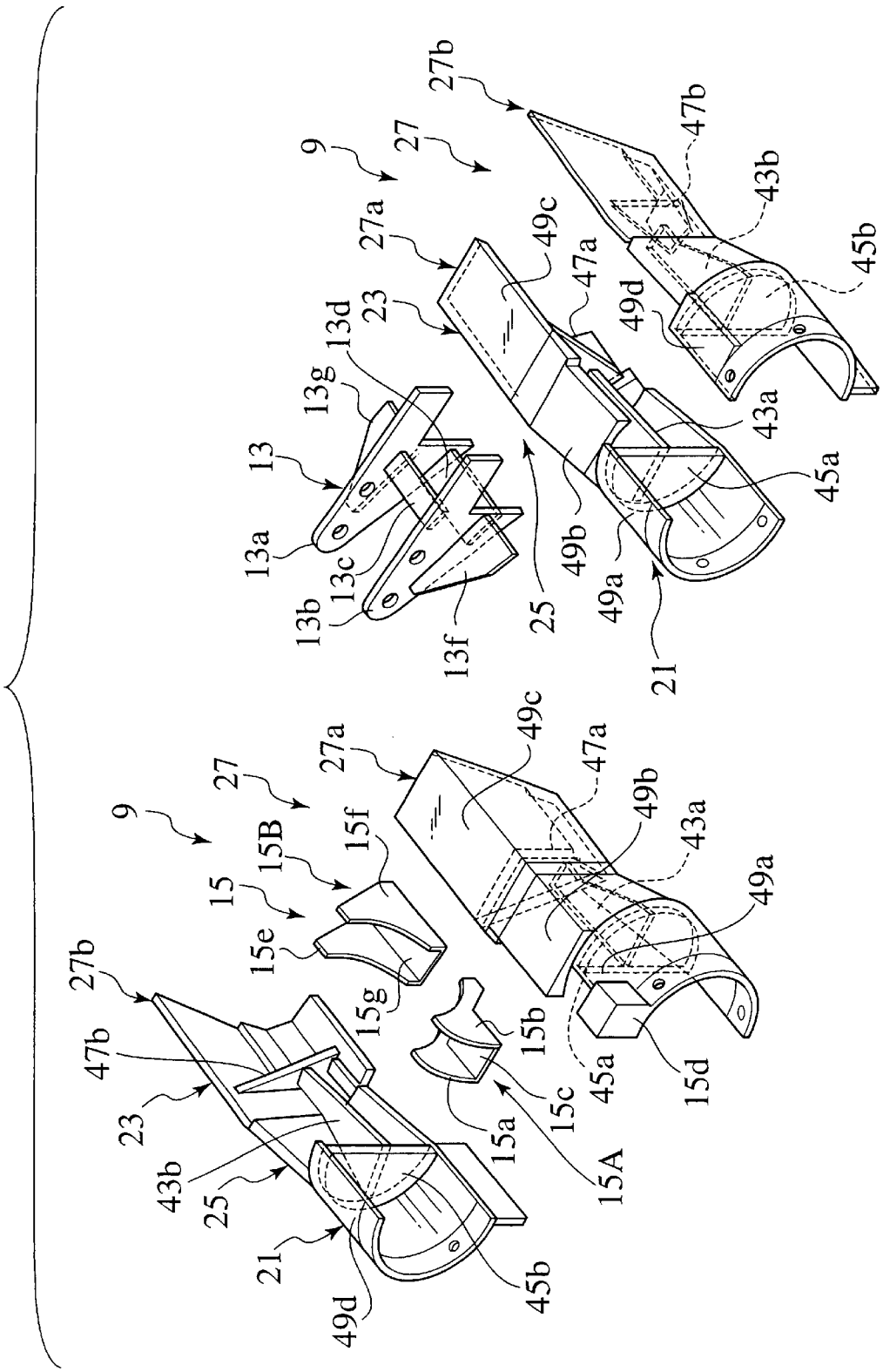
FIG. 14 is an exploded view which shows right and left intermediate joints provided with separate engine mount brackets.

The engine mount bracket 15 installed on the right side of the vehicle body, as illustrated in FIGS. 1 and 2, is different from the engine mount bracket 13, as clearly shown in FIG. 14, installed on the left side of the vehicle body. The engine mount bracket 15 in this embodiment is, like the engine mount bracket 13, formed integrally with the assembly member 27a of the intermediate joint 9 by a light metal casting.

The engine mount bracket 15 consists of front and rear bracket portions 15A and 15B. The front bracket portion 15A is formed on the front connecting portion 21. The rear bracket portion 15B is formed on the intermediate coupling portion 25. The front bracket portion 15A includes right and left side walls 15a and 15b, a bottom wall 15c, and a seat block 15d. The bottom wall 15c is formed on the seat block 15d. The side walls 15a and 15b have rear end portions which are tapered backward and connected on the upper flat surface 49d of the front connecting portion 21. The bracket portion 15B consists of side walls 15e and 15f and a bottom wall 15g. The bottom wall 15g is formed directly on the upper flat surface 49b of the front connecting portion 21. Therefore, most of the impact inputted to the engine mount bracket 15 acts on the intermediate coupling portion 25 and is absorbed in the same manner as the engine mount bracket 13.

The formation of the engine mount brackets 13 and 15 on the intermediate joints 9 by castings results in a decrease in parts making up the intermediate joint 9, thus improving the working efficiency in an assembling process and also eliminates the need for welding the engine mount brackets 13 and 15 to the intermediate joints 9, thus increasing the locational accuracy of the engine mount brackets 13 and 15.

Figure 16:
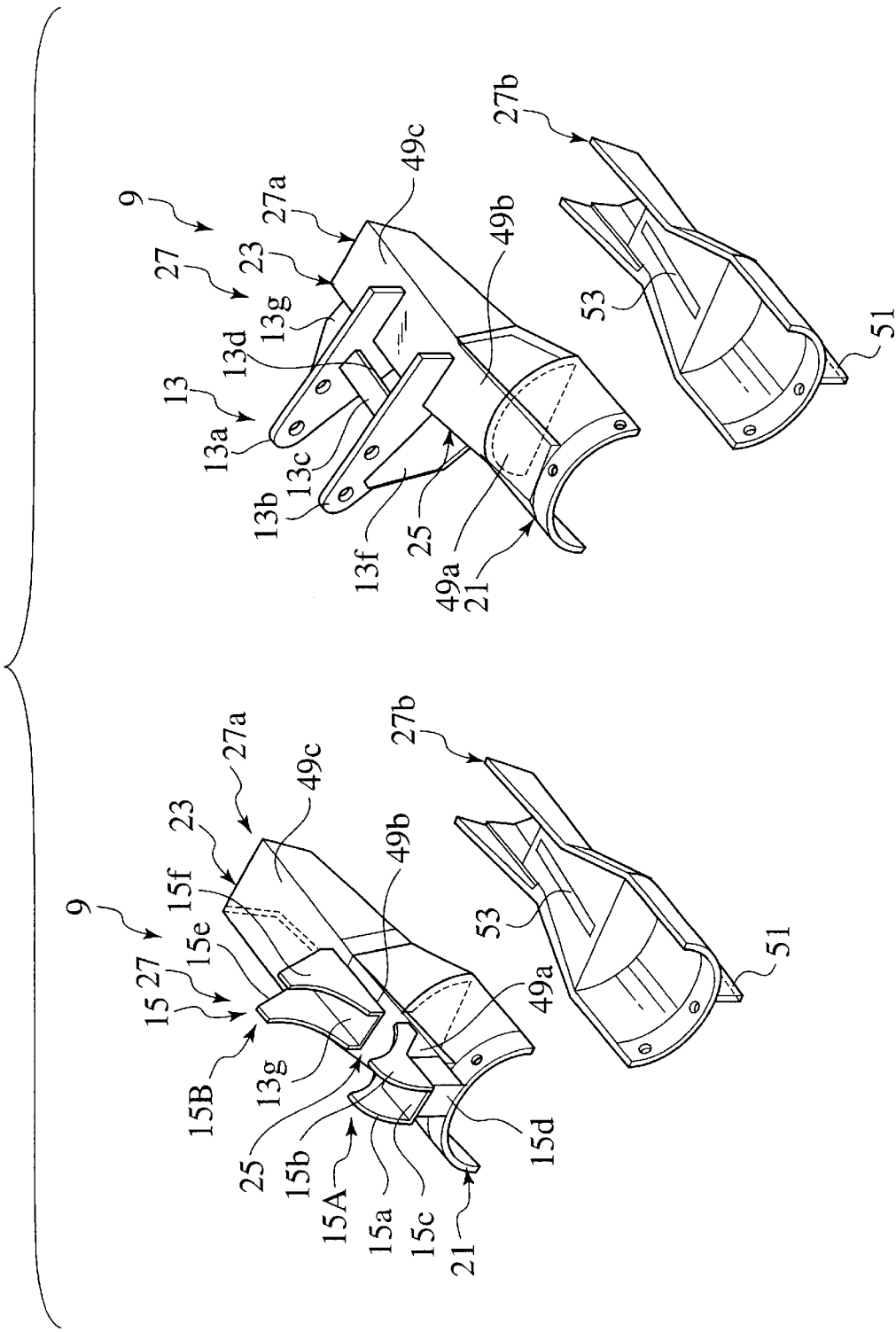
FIG. 16 is an exploded view which shows engine mount brackets integrally formed with right and left intermediate joints according to the second embodiment.

FIG. 16 shows a modification of the second embodiment.

Figure 15:
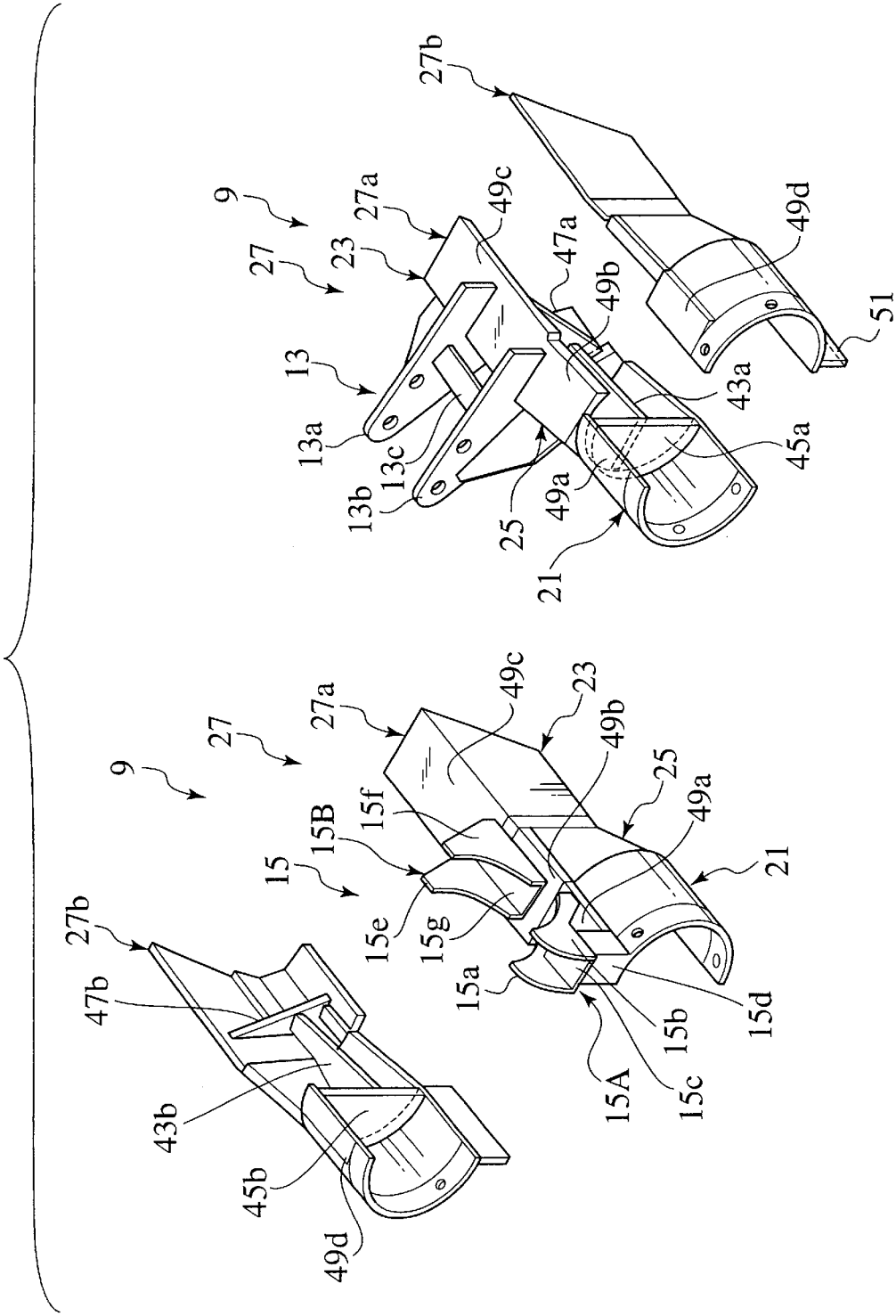
FIG. 15 is an exploded view which shows engine mount brackets integrally formed with right and left intermediate joints according to the second embodiment.

Each of the intermediate joints 9 is made of a pair of upper and lower assembly members 27a and 27b. Specifically, ends of the upper and lower assembly members 27a and 27b extend longitudinally of the vehicle body (i.e., in the lengthwise direction of the front side members 1 and 3). This allows each of the lower assembly member 27b to be employed in either of the right and left intermediate joints 9, thereby decreasing the number of casting molds by one as compared with the second embodiment in FIG. 15.

Figure 17:
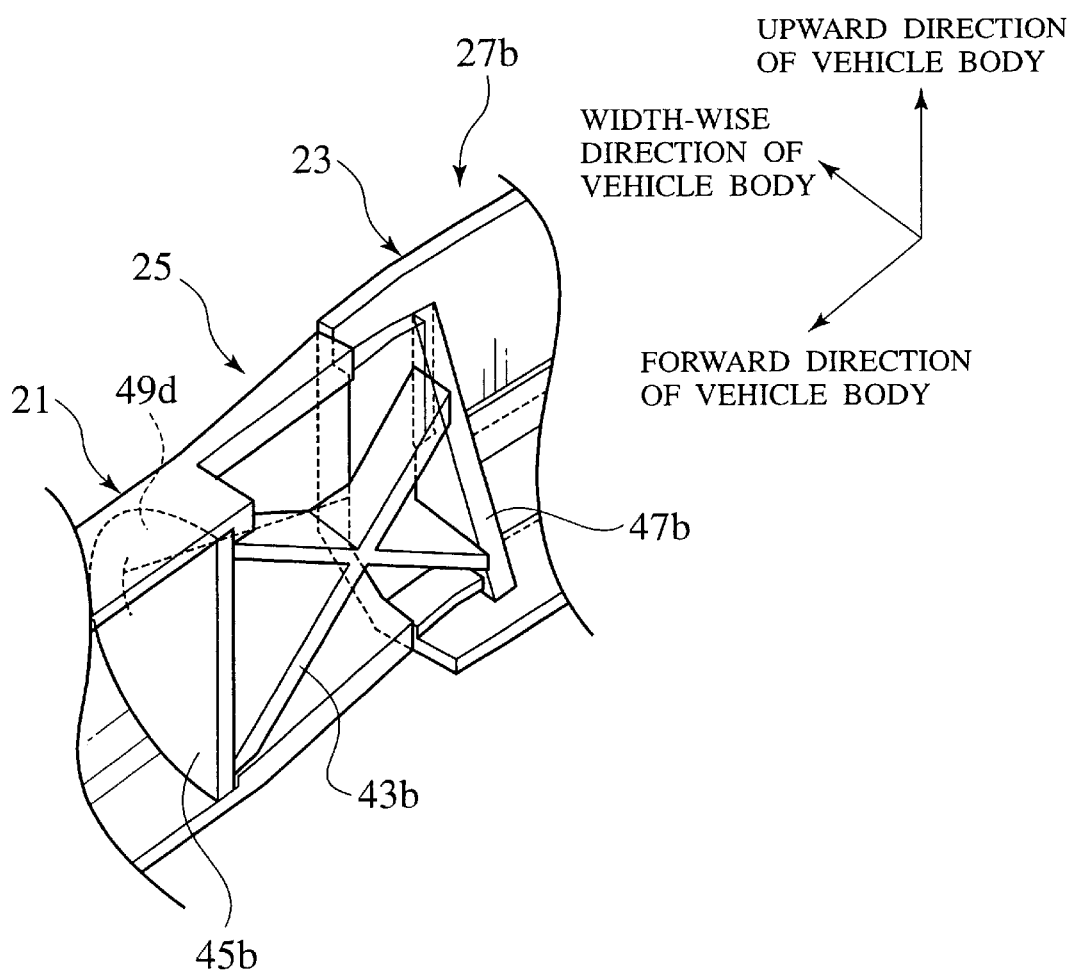
FIG. 17 is a partial perspective view which shows a rib formed on an inner wall of an intermediate joint according to the third embodiment of the invention.

The intermediate coupling portion 25 of each of the assembly members 27b is formed to be solid and has formed therein a hole 53 elongated longitudinally. This structure is used in the intermediate coupling portion 25 of each of the assembly members 27a. The thick wall around the hole 53 functions as the ribs 43a, 43b, 45a, 45b, 47a, and 47b in the above embodiments FIG. 17 shows the third embodiment of the invention which is different from the first and second embodiments in structure of the assembly members 27a and 27b of the intermediate joint 9. FIG. 17 shows only the assembly member 27b for the sake of illustration.

Each of the assembly members 27a and 27b includes the rib 43b which is, as can be seen in the drawing, of X-shape and connect with the ribs 45b and 47b. This structure increases the resistance of the front member 5 to compressive impact inputted to the front side members 1 and 3 upon occurrence of a front-end collision of the vehicle as well as impacts transmitted through the engine mount brackets 13 and 15.

Figure 18:
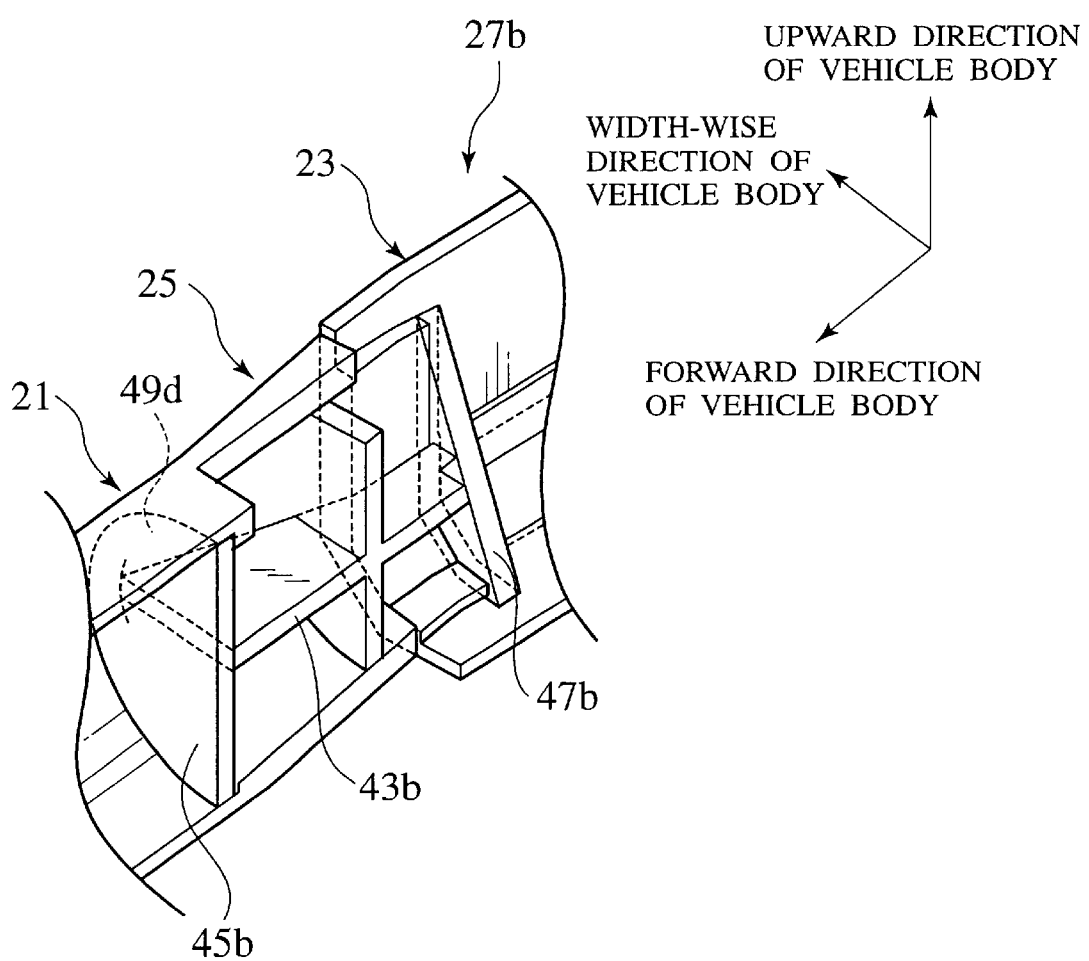
FIG. 18 is a partial perspective view which shows a modification of the third embodiment.

FIG. 18 shows a modification of the third embodiment.

The rib 43b of each of the assembly members 27a and 27b is of + − shape and connects with upper and lower walls of the intermediate coupling portion 25 as well as the ribs 45b and 47b. This structure increases the distribution of moduli of section of the intermediate coupling portion 25 further, thereby increasing the stress arising from input of various impacts.

The entire contents of Japanese Patent Application No. 11-254865 (filed on Sep. 8, 1999) is incorporated herein by reference.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An intermediate joint of an automotive side member including a front and rear member comprising:

a front connecting portion receiving therein a portion of the front member of the side member to establish connection with the front member, the front member being made of a cylindrical member having an uniform cross section;

a rear connecting portion receiving therein a portion of the rear member of the side member to establish connection with the rear member, the rear member being made of a cylindrical member having an uniform cross section; and an intermediate coupling portion made of a cylindrical member, joining said front and rear connecting portions together, said intermediate coupling portion said front and rear connecting portions, wherein said intermediate coupling portion has wall thickness greater than those of said front and rear connecting portions.

2. An intermediate joint as set forth in claim 1, wherein said intermediate coupling portion is designed to have a modulus of section greater than that of said rear connecting portion, while said rear connecting portion is designed to have a modulus of section greater than that of said front connecting portion.

3. An intermediate joint as set forth in claim 1, wherein said front member is made of an extruded thin-walled member, while said rear member is made of an extruded thick-walled member.

4. An intermediate joint as set forth in claim 1, wherein said intermediate coupling portion is cast in a light metal.

5. An intermediate joint of an automotive side member including a front and rear member comprising:

a front connecting portion receiving therein a portion of the front member of the side member to establish connection with the front member, the front member being made of a cylindrical member having an uniform cross section;

a rear connecting portion receiving therein a portion of the rear member of the side member to establish connection with the rear member, the rear member being made of a cylindrical member having an uniform cross section; and an intermediate coupling portion made of a cylindrical member, joining said front and rear connecting portions together, said intermediate coupling portion being so formed physically as to have a degree of rigidity greater than those of said front and rear connecting portions; and wherein said front connecting portion is formed by a hollow cylindrical member made up of a plurality of component members connected end to end along front split lines extending longitudinally of a vehicle body, said rear connecting portion is formed by a hollow cylindrical member made up of a plurality of component members connected end to end along rear split lines extending longitudinally of the vehicle body, and said intermediate coupling portion is formed by a hollow cylindrical member made up of a plurality of component members connected end to end along intermediate split lines, the intermediate split lines continuing at ends thereof from the front and rear split lines and having at least a portion oriented in a width-wise direction of the vehicle body.

6. An intermediate joint as set forth in claim 5, wherein the front split lines are offset from the rear split lines in the width-wise direction of the vehicle.

7. An intermediate joint as set forth in claim 5, wherein the front split lines are defined intermediate between a right and a left side of said front connecting portion in the width-wise direction of the vehicle body, and the rear split lines are defined intermediate between a right and a left side of said rear connecting portion in the width-wise direction of the vehicle body.

8. An intermediate joint as set forth in claim 5, wherein the component members of each of said front and rear connecting portions and said intermediate coupling portion are connected through butt joint.

9. An intermediate joint as set forth in claim 5, wherein the front and rear members have a circular or polygonal sectional area, and the front connecting portion has a sectional area conforming to that of said front member.

10. An intermediate joint as set forth in claim 5, wherein the intermediate split lines are asymmetrical with each other.

11. An intermediate joint as set forth in claim 5, wherein one of the intermediate split line includes a series of a front and a rear lateral segment and an intermediate longitudinal segment, the front and rear lateral segments extending laterally of the vehicle body, the intermediate longitudinal segment extending longitudinally of the vehicle body.

12. An intermediate joint as set forth in claim 5, wherein one of the intermediate split line includes a series of a front and a rear lateral segments, an intermediate lateral segment, and a front and a rear longitudinal segments connecting the front and rear lateral segments and the intermediate segment, the front and the rear lateral segments and the intermediate lateral segment extending laterally of the vehicle body, the front and rear longitudinal segments extending longitudinally of the vehicle body.

13. An intermediate joint as set forth in claim 5, wherein one of the intermediate split lines has a curved segment whose ends are oriented in a direction diagonal to the width-wise direction of the vehicle body.

14. An intermediate joint as set forth in claim 1, further comprising an engine mount bracket formed by a casting integrally with said intermediate coupling portion.

15. An intermediate joint as set forth in claim 14, wherein said intermediate coupling portion has formed therein a rib for reinforcing the engine mount bracket.

16. A vehicle body comprising:
side members extending in a longitudinal direction of a vehicle body, each of said side members including a front cylindrical member having a uniform section area and a rear cylindrical member having a uniform sectional area;
a cross member extending in a width-wise direction of the vehicle body to connect said side members;
intermediate joints each of which joins the front cylindrical member and the rear cylindrical member of one of said side members, each of said intermediate joints including a front connecting portion receiving therein a portion of the front cylindrical member of one of the side members to establish connection with the front cylindrical member, a rear connecting portion receiving therein a portion of the rear cylindrical member of the one of the side members to establish connection with the rear cylindrical member, and an intermediate coupling portion made of a cylindrical member, joining said front and rear connecting portions together, said intermediate coupling portion having a wall thickness greater than that of the front and rear connecting portions and being formed so as to have a degree of rigidity greater than those of said front and rear connecting portions.

17. A vehicle body comprising side members extending in a longitudinal direction of a vehicle body, each of said side members including a front cylindrical member having a uniform section area and a rear cylindrical member having a uniform sectional area;
a cross member extending in a width-wise direction of the vehicle body to connect said side members;
intermediate joints each of which joins the front cylindrical member and the rear cylindrical member of one of said side members, each of said intermediate joints including a front connecting portion receiving therein a portion of the front cylindrical member of one of the side members to establish connection with the front cylindrical member, a rear connecting portion receiving therein a portion of the rear cylindrical member of the one of the side members to establish connection with the rear cylindrical member, and an intermediate coupling portion made of a cylindrical member, joining said front and rear connecting portions together, said intermediate coupling portion being formed so as to have a higher rigidity than those of said front and rear connection portions; and
wherein said front connecting portion of each of said intermediate joints is formed by a hollow cylindrical member made up of a plurality of component members connected end to end along front split lines extending longitudinally of a vehicle body, said rear connecting portion of each of said intermediate joints is formed by a hollow cylindrical member made up of a plurality of component members connected end to end along rear split lines extending longitudinally of the vehicle body, and said intermediate coupling portion of each of said intermediate joints is formed by a hollow cylindrical member made up of a plurality of component members connected end to end along intermediate split lines, the intermediate split lines continuing at ends thereof from the front and rear split lines and having at least a portion oriented in a width-wise direction of the vehicle body.

18. An intermediate joint of an automotive side member including a front and rear member comprising:
front connecting means for connecting with a portion of the front member of the side member, the front member being made of a cylindrical member having an uniform cross section;
rear connecting means for connecting with a portion of the rear member of the side member, the rear member being made of a cylindrical member having an uniform cross section; and
intermediate coupling portion for coupling said front and rear connecting means, said intermediate coupling means having a wall thickness greater than that of the front and rear connecting portions and being made of a cylindrical member having a degree of rigidity greater than those of said front and rear connecting means.

19. A vehicle body comprising:
side member means extending in a longitudinal direction of a vehicle body, each of said side member means including a front cylindrical member having a uniform sectional area and a rear cylindrical member having a uniform sectional area;

cross member means extending in a width-wise direction of the vehicle body to connect said side member means;

intermediate joining means for joining the front cylindrical member and the rear cylindrical member of said side member means, said intermediate joining means including a front connecting portion receiving therein a portion of the front cylindrical member of said side member means to establish connection with the front cylindrical member, a rear connecting portion receiving therein a portion of the rear cylindrical member of said side member means to establish connection with the rear cylindrical member, and an intermediate coupling portion made of a cylindrical member, joining said front and rear connecting portions together, said intermediate coupling portion having a wall thickness greater than that of the front and rear connecting portions and having a degree of rigidity greater than those of said front and rear connecting portions.

20. An intermediate joint for an automotive side member that includes a front and rear member, the intermediate joint comprising:

a front connecting portion adapted to receive a portion of the front member;

a rear connecting portion disposed rearward of the front connecting portion and being adapted to receive a portion of the rear member of the side member;

an intermediate coupling portion joining the front connecting portion to the rear connecting portion, the intermediate portion having a higher rigidity than the front and rear connecting portion and having a wall thickness greater than that of the front connecting portion and the rear connecting portion.

21. An intermediate joint as claimed in claim 20, wherein the front connecting portion comprises at least two members connected at front split lines that extend in a lengthwise direction of the intermediate joint.

22. An intermediate joint as claimed in claim 21, wherein the rear connecting portion comprises at least two members connected along rear split lines that extend in a lengthwise direction of the intermediate joint.

23. An intermediate joint as claimed in claim 22, wherein the intermediate coupling portion comprises at least two members connected along intermediate split lines, the intermediate split lines connecting the rear split lines and the front split lines and having at least a portion oriented in a width-wise direction of the vehicle body.

24. An intermediate joint as claimed in claim 23, wherein each of the front connecting portion, the rear connecting portion, and the intermediate coupling portion is substantially hollow and substantially cylindrical.

25. An intermediate joint as claimed in claim 24, wherein each of the front connecting portion and the rear connecting portion has a substantially uniform cross-section.

* * * * *